United States Patent
He

(10) Patent No.: US 8,284,829 B2
(45) Date of Patent: Oct. 9, 2012

(54) SINGLE CARRIER/MULTI CARRIER COMMUNITY RECEIVER

(75) Inventor: Wei-Hung He, Kaohsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 389 days.

(21) Appl. No.: 12/624,421

(22) Filed: Nov. 24, 2009

(65) Prior Publication Data

US 2010/0128774 A1 May 27, 2010

(30) Foreign Application Priority Data

Nov. 24, 2008 (TW) ................................ 97145308 A

(51) Int. Cl.
*H03H 7/30* (2006.01)
*H04B 1/10* (2006.01)

(52) U.S. Cl. ........................................ 375/232; 375/350

(58) Field of Classification Search .......... 375/232–233, 375/260, 340–341, 346, 350; 370/290–291
See application file for complete search history.

(56) References Cited

U.S. PATENT DOCUMENTS

| | | | |
|---|---|---|---|
| 6,608,864 B1 * | 8/2003 | Strait | 375/233 |
| 7,020,212 B1 * | 3/2006 | Strait | 375/260 |
| 7,023,938 B1 * | 4/2006 | Kapoor et al. | 375/350 |
| 7,693,225 B2 * | 4/2010 | Lin et al. | 375/260 |
| 7,912,118 B2 * | 3/2011 | Wang et al. | 375/229 |
| 2006/0227859 A1 * | 10/2006 | Wei et al. | 375/233 |
| 2007/0064824 A1 | 3/2007 | Wang | |
| 2007/0121718 A1 * | 5/2007 | Wang et al. | 375/233 |
| 2010/0046599 A1 * | 2/2010 | Kim et al. | 375/233 |

* cited by examiner

*Primary Examiner* — Khanh C Tran

(74) *Attorney, Agent, or Firm* — Winston Hsu; Scott Margo

(57) ABSTRACT

A single carrier/multi carrier community receiver includes: a first discrete Fourier transform unit, for generating a frequency-domain signal by executing a first discrete Fourier transform on a received signal received via the single carrier/multi carrier; a first frequency-domain equalizer, for generating a first equalized frequency-domain signal by executing a first equalizing process on the frequency-domain signal; an inverse discrete Fourier transform unit, coupled to the first frequency-domain equalizer, for generating a first equalized time-domain signal executing an inverse discrete Fourier transform according to the first equalized frequency-domain signal; a slicer, coupled to the inverse discrete Fourier transform unit, for generating a sliced time-domain signal by executing a slicing process according to the first equalized time-domain signal; and a compensating circuit, for compensating the first equalized frequency-domain signal or the first equalized time-domain signal at least according to the sliced time-domain signal.

22 Claims, 3 Drawing Sheets

SINGLE CARRIER/MULTI CARRIER COMMUNITY RECEIVER

BACKGROUND OF THE INVENTION

1. Field of the Invention

The present invention relates to receivers of digital television systems, and more particularly, to a receiver capable of being selectively operated between a single carrier mode and a multi carrier mode to accordingly receive a single carrier signal or a multi carrier signal, and a signal processing method thereof. By the implementation of a compensating circuit (e.g., a compensating circuit for an equalizer), the unwanted color noises in the received single carrier signals of the single carrier/multi carrier community receiver are successfully restrained to thereby improve the performance of the single carrier/multi carrier community receiver.

2. Description of the Prior Art

A digital television system is one of the most common technologies of modern life. Generally, television systems can be divided into single carrier mode systems and multi carrier mode systems, wherein a particular standard established by Mainland China called Digital Terrestrial Multimedia Broadcasting (DTMB) is a specific standard allowing both the single carrier mode and the multi carrier mode.

To efficiently implement hardware circuits that comply with the DTMB standard, it is therefore an important issue to provide a single carrier/ multi carrier community receiver. By providing a shared circuit structure of both the single carrier mode and the multi carrier mode, the required cost of the DTMB receiver is effectively cut down.

However, the existing single carrier/multi carrier community receiver fails to successfully filter out noise that exists in the received signals, especially when the single carrier/multi carrier community receiver operates under the single carrier mode. This leads to a poor performance corresponding to the single carrier mode of the single carrier/multi carrier community receiver.

SUMMARY OF THE INVENTION

It is therefore an objective of the present invention to solve the aforementioned problems by providing a single carrier/multi carrier community receiver to keep the received signal of single carrier/multi carrier community receiver free from noise interference, thereby improving the output performance of the single carrier/multi carrier community receiver.

According to an aspect of the present invention, a single carrier/multi carrier community receiver is provided. The single carrier/multi carrier community receiver includes: a first discrete Fourier transform unit, a first frequency-domain equalizer, an inverse discrete Fourier transform unit, a slicer, and a compensating circuit. The first discrete Fourier transform unit generates a frequency-domain signal by executing a first discrete Fourier transform on a received signal, wherein the received signal is received via the single carrier/multi carrier. The first frequency-domain equalizer, coupled to the first discrete Fourier transform unit, and the first frequency-domain equalizer generates a first equalized frequency-domain signal by executing a first equalizing process on the frequency-domain signal. The inverse discrete Fourier transform unit is coupled to the first frequency-domain equalizer, and generates a first equalized time-domain signal by executing an inverse discrete Fourier transform according to the first equalized frequency-domain signal. The slicer is coupled to the inverse discrete Fourier transform unit and generates a sliced time-domain signal by executing a slicing process according to the first equalized time-domain signal. The compensating circuit compensates the first equalized frequency-domain signal or the first equalized time-domain signal at least according to the sliced time-domain signal.

According to another aspect of the present invention, a method for processing a received signal received by a single carrier/multi carrier community receiver is provided. The method includes: generating a frequency-domain signal by executing a first discrete Fourier transform on a received signal; generating a first equalized frequency-domain signal by executing a first equalizing process on the frequency-domain signal; generating a first equalized time-domain signal by executing an inverse discrete Fourier transform according to the first equalized frequency-domain signal; generating a sliced time-domain signal by executing a slicing process according to the first equalized time-domain signal; and compensating the first equalized frequency-domain signal or the first equalized time-domain signal at least according to the sliced time-domain signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
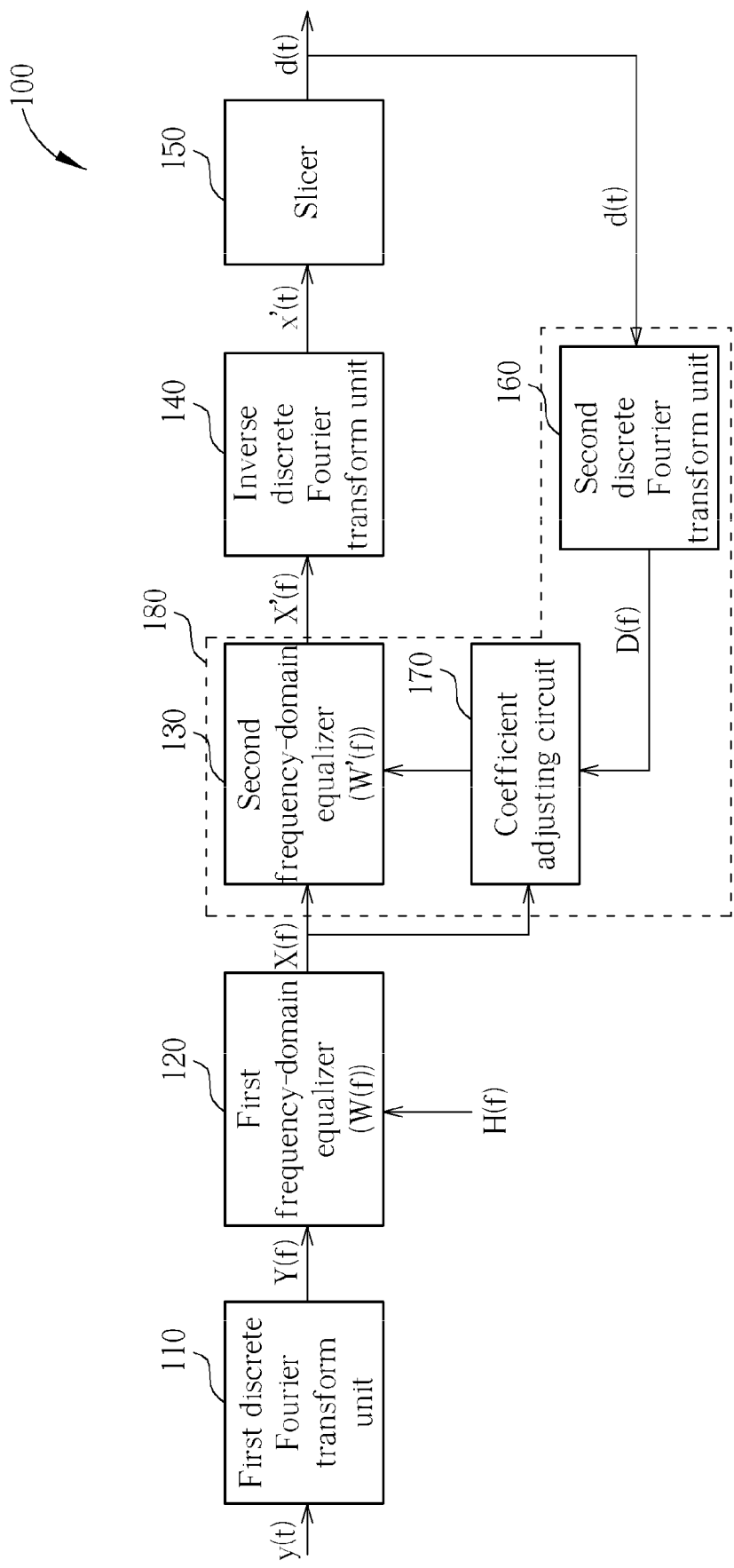
FIG. 1 is a diagram illustrating a single carrier/multi carrier community receiver according to an exemplary embodiment of the present invention.

FIG. 1 is a diagram illustrating a single carrier/multi carrier community receiver according to an exemplary embodiment of the present invention. The single carrier/multi carrier community receiver 100 can be operated under both a single carrier mode and a multi carrier mode. As shown in FIG. 1, the single carrier/multi carrier community receiver 100 includes (but is not limited to) a first discrete Fourier transform unit 110, a first frequency-domain equalizer 120, an inverse discrete Fourier transform unit 140, a slicer 150 and a compensating circuit 180 for compensating the equalizer 120.

In addition, in this embodiment the compensating circuit 180 includes (but is not limited to) a second frequency-domain equalizer 130, a second discrete Fourier transform unit 160 and a coefficient adjusting circuit 170 for dynamically adjusting the coefficients of the second frequency-domain equalizer 130, herein the coefficient of the second frequency-domain equalizer 170 is expressed as W'(f). The compensating equalizer 180 in this invention is configured for compensating a first equalized signal (X(f)) outputted from the first frequency-domain equalizer 120. By the operations in the compensating circuit corresponding to particular mathematical algorithms, the noises (e.g., color noises) that exist in the first equalized signal X(f) are effectively eliminated to thereby make the time domain signal (e.g., the sliced time domain signal d(t)) outputted from the slicer 150 approximate to the transmitted baseband signal transmitted by a transmitter corresponding to the single carrier/multi carrier community receiver 100. The aforementioned baseband signal at the transmitter is expressed as z(f) in the following descriptions.

For a conventional single carrier mode receiver system which only complies with a single carrier mode, the corresponding signal processing is executed in the time domain, which leads to the channel interference of the convention single carrier mode receiver system being completely filtered out by a time-domain equalizer. However, once the received single carrier signal is transformed from the time domain to the frequency domain (e.g., by executing a discrete Fourier transform), the unwanted noises in the single carrier signal at frequency domain still remain. That is, the output performance of the conventional single carrier/multi carrier community receiver under the single carrier mode is inferior since the single carrier/multi carrier community receiver fails to get the precise channel responses under frequency-domain operations, making the recovered signal in the single carrier/multi carrier community receiver dissimilar to the baseband signal z(t) at the transmitter.

In this exemplary embodiment, the first equalized frequency-domain signal X(f) is compensated by a second frequency-domain equalizer 130 for eliminating the remaining noises of the first equalized frequency-domain signal X(f), wherein the second frequency-domain equalizer 130 is an adaptive equalizer since the coefficient (W'(f)) of the second frequency-domain equalizer 130 is dynamically adjusted by the coefficient adjusting circuit 170. In this way, the defectively received single carrier signal is eliminated from the single carrier/multi carrier community receiver 100.

In more detail, in this embodiment, the second frequency-domain equalizer 130 is coupled to the first frequency-domain equalizer 120 to dynamically update the coefficient (W'(f)) of the second frequency-domain equalizer 130 via a feedback scheme. For instance, the feedback scheme for compensating the defective first equalized frequency-domain signal (X(f)) can be implemented by the second frequency-domain equalizer 130, the inverse discrete Fourier transform unit 140, the slicer 150, the second discrete Fourier transform unit 160, and the coefficient adjusting circuit 170. In this manner, the outputted signal (e.g., the sliced time-domain signal d(t)) generated from the single carrier/multi carrier community receiver 100 is approximated to the baseband signal z(t) at the transmitter.

In brief, by implementing the compensating circuit 180 (including the second frequency-domain equalizer 130, the coefficient adjusting circuit 170 and the second discrete Fourier transform unit 160), the dilemma of required cost vs. signal quality of the single carrier/multi carrier community receiver can be solved.

Please refer to FIG. 1. The detailed operations of the single carrier/multi carrier community receiver 100 are disclosed as follows. Here, it is supposed that the coefficient of the first frequency-domain equalizer 120 is expressed as W(f), and the received single carrier signal is expressed as y(t); therefore the first equalized frequency-domain signal X(f) outputted from the first frequency-domain equalizer 120 at this time can be represented as follows:

$$X(f)=W(f)*Y(f) \qquad (1)$$

As mentioned above, the second equalizer (e.g., the second frequency-domain equalizer 130 in FIG. 1) is implemented for compensating the first equalized frequency domain signal X(f) generated by the first frequency-domain equalizer 110, thereby effectively eliminating the color noises that exist in the received single carrier signal (y(t)). That is, supposing the coefficient of the second frequency-domain equalizer 130 is represented as W'(f), and the second equalized frequency-domain signal is represented as X'(f), the second equalized frequency-domain signal X'(f) can then be expressed as follows:

$$X'(f)=W'(f)*X(f) \qquad (2)$$

The second equalized frequency-domain signal X'(f) is transformed into the time domain via the inverse discrete Fourier transform unit 140. In the following, the generated time-domain signal from the inverse discrete Fourier transform unit 140 is represented as x'(t) and the slicer 150 executes a slicing operation upon the first equalized time-domain signal x'(t) to thereby derive the sliced time-domain signal d(t).

Please note that, in FIG. 1, the first frequency-domain equalizer 120 and the second frequency-domain equalizer 130 are adaptive filters, with variable coefficients (W(f) and W'(f), respectively. For instance, the adopted algorithms for updating the coefficient (W(f)) of the first frequency-domain equalizer 120 is the Minimum Mean Squared Error (MMSE) algorithm. The time-domain baseband signal at the transmitter is represented as z(t), and the received baseband time-domain signal is represented as y(t), where the received single carrier signal y(t) is a variable associated with time-domain channel response h(t) and noises n(t). The received single carrier signal y(t) can be mathematically expressed as follows:

$$y(t)=\text{con}(h(t),z(t))+n(t) \qquad (3)$$

Furthermore, the aforementioned equation (3) in the frequency domain can be expressed as:

$$Y(f)=H(f)*Z(f)+N(f) \qquad (4)$$

Please refer again to FIG. 1. Herein the coefficient (W(f)) of the first frequency-domain equalizer 120 can be derived via an "expected-value" operation:

$$E\{|Z(f)-W(f)*Y(f)|^2\} \qquad (5)$$

Once the MMSE algorithm is chosen, the coefficient (W(f)) of the first frequency-domain equalizer 120 in equation (5) is derived as:

$$W(f) = \frac{H^*(f)}{(|H(f)|^2 + K*E[|N(f)|^2])} \qquad (6)$$

In equation (6), H*(f) is the complex conjugate of the frequency-domain channel response H(f), K is a constant, and the expected value is E[|N(f)|²] is proportional to the existing noise power.

However, the output performance for the single carrier signal is sometimes restricted due to the noise signal N(f) existing in the frequency-domain signal Y(f) not being purely a color noise, which leads to the noise signal N(f) existing in the frequency domain signal Y(f) being difficult to be precisely predicted. In the present invention, the compensating circuit 180 ensures the output performance of the single carrier/multi carrier community receiver 100 to obtain the ideal recovered time-domain signal (e.g., the sliced time-domain signal d(t) in FIG. 1) by executing a compensating operation upon the first equalized time-domain signal X(f). In this way, even under the single carrier mode, the derived time-domain signal d(t) is ensured to be similar to the corresponding time-domain signal z(t) at the transmitter, and thereby the problem of the conventional single carrier/multi carrier community receiver can be solved.

Please refer to FIG. 1 again. The coefficient W'(f) of the second frequency-domain equalizer 130 can be derived by an expected-value operation as follows:

$$E\{|D(f)-W'(f)*X(f)|^2\} \quad (7)$$

Supposing that the MMSE algorithm is adopted here, the coefficient (W'(f)) of the second frequency-domain equalizer 130 can be expressed as follows:

$$E[X(f)*(D(f)-W'(f)*X(f))] \quad (8)$$

The aforementioned disclosure is for illustrative purposes only. In alternative designs of the present invention, supposing that the initial value of the coefficient (W'(f)) corresponding to the second frequency-domain equalizer is set to be "1", and the coefficient W'(f) is updated in each block, then the updating process of the coefficient W'(f) of the second frequency-domain equalizer 130 can be expressed as follows:

$$Wn'(f)=W_{n-1}'(f)+\text{stepsize}*X(f)*\text{conj}(D(f)-X'(f)) \quad (9)$$

In equation (9), D(f) expresses the corresponding frequency-domain expression of the sliced time-domain signal d(t), and the sliced frequency-domain signal D(f) is derived by the second discrete Fourier transform unit 160. By the aforementioned operations and hardware circuits thereof, a converged coefficient W'(f) is derived. By the converged coefficient W'(f) of the second frequency-domain equalizer 130, a minimum of the expected value $E\{|D(f)-W'(f)*X(f)|^2\}$ is chosen, resulting in the required quality of the recovery baseband time-domain (e.g., the sliced time-domain signal d(t) from the slicer 150).

In short, through utilization of the compensating circuit 180, the single carrier/multi carrier community receiver 100 adjusts the coefficient W'(f) of the second frequency-domain equalizer 130, especially when the noise signal N(f) is acute. That is, the single carrier/multi carrier community receiver 100 of the present invention provides a coefficient W'(t) with smaller value when the noise signal N(f) is large/ acute via the operations of the equation (7). By the mathematic algorithm and corresponding hardware circuits, the compensating circuit 180 effectively compensates the equalized signal to thereby derive a better sliced time-domain signal (d(t)) and simultaneously improve the performance of the single carrier/multi carrier community receiver 100.

Please note that the aforementioned description is for illustrative purposes only and is not meant to be a limitation of the present invention. Alternative configurations are allowed with suitable design variations.

Figure 2:
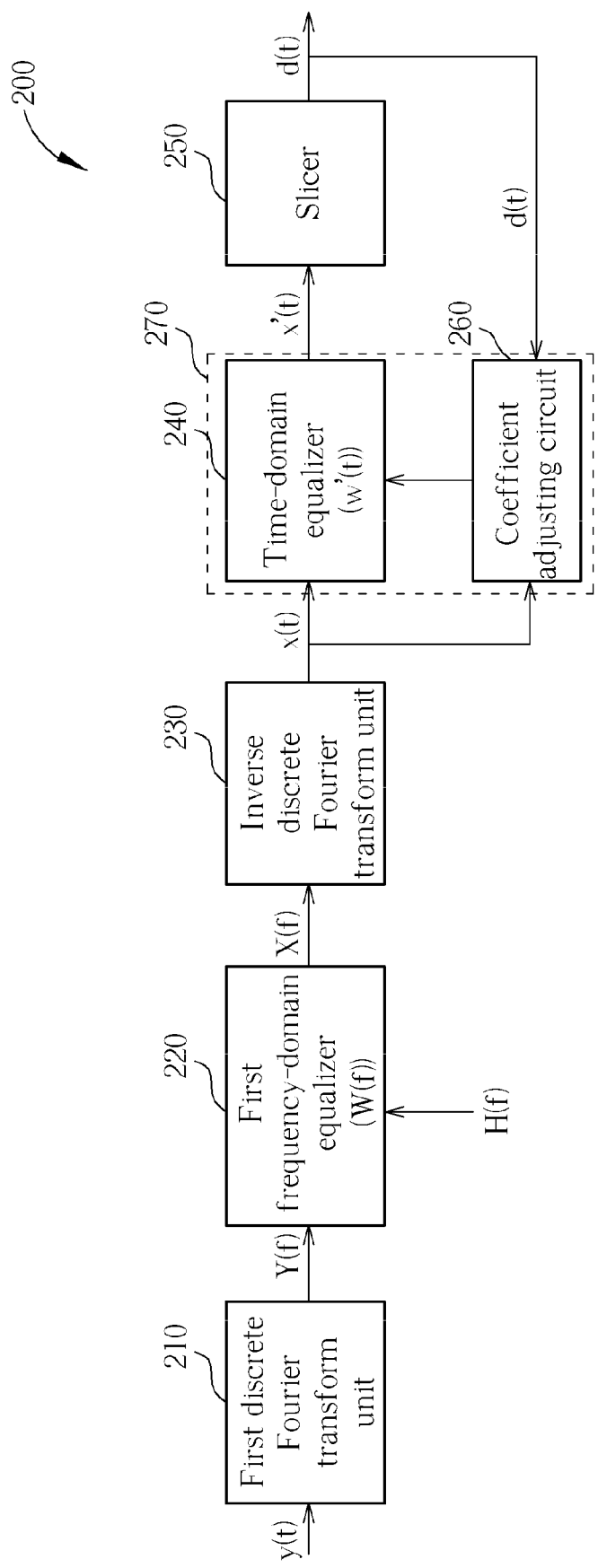
FIG. 2 is a diagram illustrating a single carrier/multi carrier community receiver according to another exemplary embodiment of the present invention.

Please refer to FIG. 2. FIG. 2 is a diagram illustrating a single carrier/multi carrier community receiver according to another embodiment of the present invention. The single carrier/multi carrier community receiver 200 can be operated under both a single carrier mode and a multi carrier mode. In this embodiment, the compensating circuit 270 is operated in the time-domain for compensating the first equalized frequency-domain signal X(f) outputted from the first frequency-domain equalizer 220 and hence eliminating the noise.

As shown in FIG. 2, the single carrier/multi carrier community receiver 200 includes (but is not limited to): a time-domain equalizer 240 and a coefficient adjusting circuit 260, where the time-domain equalizer 240 is coupled between the inverse discrete Fourier transform unit 230 and a slicer 250, and the time-domain equalizer 240 compensates the first equalized time-domain signal x(t). The first equalized time-domain signal x(t) is derived from the inverse discrete Fourier transform unit 230.

In this exemplary embodiment the first frequency-domain equalizer 220 and the time-domain equalizer 240 are both adaptive filters, and the coefficient W(f) of the first frequency-domain equalizer 220 is derived according to the channel response H(f) of the single carrier/multi carrier community receiver 200. The coefficient w'(t) of the time-domain equalizer 240 is dynamically updated by the coefficient adjusting circuit 260. The operations and structure of the single carrier/multi carrier community receiver 200 are similar to that of the single carrier/multi carrier community carrier 100 above, except that the compensating circuit 180 in FIG. 1 is operated in the frequency domain and the compensating circuit 270 in FIG. 2 is operated in the time domain. Since people skilled in this art can easily understand the operations and details of the single carrier/multi carrier community receiver 200 from the above descriptions of the single carrier/multi carrier community 100, further description is omitted here for the sake of brevity.

Furthermore, in this invention, the adopted algorithms are not restricted to be MMSE algorithms. For instance, in other exemplary embodiments, the Recursive Least Square (LMS) can be adopted to update/derive the coefficients W'(f) of the second frequency-domain equalizer 180 and the coefficient w'(t) of the time-domain equalizer 240. The aforementioned design variations obey and fall within the scope of the present invention.

In addition, the operations of the compensating circuits are adjustable according to different design requirements. For instance, the operations of the compensating circuit stop keeping the coefficient of the equalizer (the second frequency-domain equalizer 130 or the time-domain equalizer 240) at a fixed value once the quality of the sliced time-domain signal d(t) is sufficient. Alternatively, the block size is adjustable according to the design requirements, hence the time interval for updating the coefficient of the equalizer (the second frequency-domain equalizer 130 and the time-domain equalizer 240) is varied.

In short, the configurations of FIG. 1 and FIG. 2 are not meant to be limitations of the present invention, and alternative single carrier/multi carrier community receiver having a compensating scheme to compensate the equalized signal also fall within the scope of the present invention.

Figure 3:
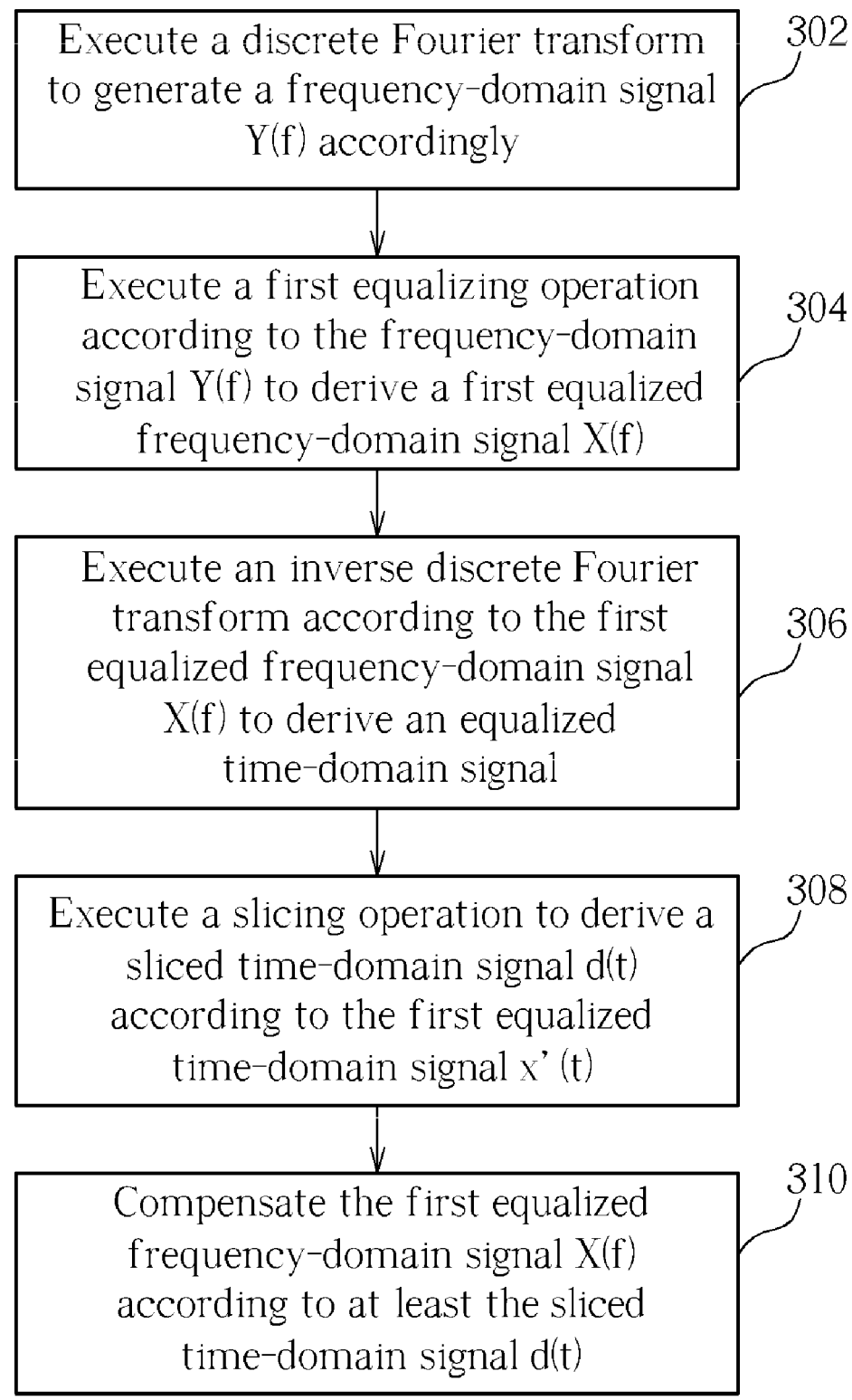
FIG. 3 is a flowchart illustrating the operating flow applied to the single carrier/multi carrier community receiver of the present invention.

Please refer to FIG. 3. FIG. 3 is a flowchart illustrating the operating flow applied to the single carrier/multi carrier community receiver of the present invention. Please note that if the result is substantially the same, the steps are not limited to be executed according to the exact order shown in FIG. 3. The flow includes the following steps:

Step 302: Execute a discrete Fourier transform upon a received single carrier signal y(t) to generate a frequency-domain signal Y(f) accordingly.

Step 304: Execute a first equalizing operation according to the frequency-domain signal Y(f) to derive a first equalized frequency-domain signal X(f).

Step 306: Execute an inverse discrete Fourier transform according to the first equalized frequency-domain signal X(f) to derive an equalized time-domain signal. (For instance, in FIG. 1, after the second frequency-domain equalizer 130 derives the second equalized frequency-domain signal X'(f) according to the first equalized frequency-domain signal X(f), the sliced time-domain signal x'(t) is derived from an inverse discrete Fourier transform via the inverse discrete Fourier transform unit 140. In the single carrier/multi carrier community receiver 200 in FIG. 2, the first equalized time-domain signal x(t) is derived by executing an inverse discrete Fourier transform upon the first equalized frequency-domain signal X(f)).

Step 308: Execute a slicing operation to derive a sliced time-domain signal d(t) according to the first equalized time-domain signal x'(t). For instance, for the single carrier/multi carrier community receiver 100, the first equalized time-domain signal x'(t) is derived after the operations of the second frequency-domain equalizer 130, and the inverse discrete Fourier transform unit 140; then the slicer 150 generates the sliced time-domain signal d(t) according to the first equalized time-domain signal x'(t). For the single carrier/multi carrier community receiver 200, the first equalized time-domain signal x'(t) is derived by the inverse discrete Fourier transform unit 230 and the time-domain equalizer 240; then the slicer 250 outputs the sliced time-domain signal d(t) by executing a slicing operation upon the first equalized time-domain signal x'(t).

Step 310: Compensate the first equalized frequency-domain signal X(f) according to at least the sliced time domain signal d(t). For instance, in the single carrier/multi carrier community receiver 100, the compensating circuit 180 adjusts the coefficient W'(f) for compensating the first equalized frequency-domain signal X(f) according to the sliced time-domain signal d(t) and the first equalized frequency-domain signal X(f). In the single carrier/multi carrier community receiver 200, the compensating circuit 270 dynamically adjusts the coefficient w'(t) of the time-domain equalizer 240 for compensating the first equalized time-domain signal according to the sliced time-domain signal d(t) and the first equalized time-domain signal x(t).

Please note that, in the above steps, the second equalizing process (corresponding to the second frequency-domain equalizer 130 and the time-domain equalizer 240) is an adaptive filtering process; furthermore, the single carrier/multi carrier community receiver adjusts the coefficient (W'(f)) of the second frequency-domain equalizer 130 and the coefficient (w'(t)) of the time-domain equalizer 240 by selectively adopting a Lease Mean Square (LMS) operation, a Recursive Least Square (RLS) operation or other mathematical operations to update/adjust the coefficient of the equalizer in the compensating circuits.

Since the detail operations of the single carrier/multi carrier community receiver 100, 200 for effectively eliminating the noise (including the color noise) of the received single carrier signal y(t) when the single carrier/multi carrier community receiver is operated under the single carrier mode, further descriptions here is omitted for brevity.

In conclusion, the single carrier/multi carrier community receiver of the present invention provides a compensating scheme for compensating signals outputted from the first frequency-domain equalizer 120, 220, hence eliminating noise and improving the output performance of the single carrier/multi carrier community receiver. Alternative designs that adopt further equalizer-compensating operations (in the time domain or frequency domain) for compensating defective characteristics of the first frequency-domain equalizer also fall within the scope of the present invention.

Those skilled in the art will readily observe that numerous modifications and alterations of the device and method may be made while retaining the teachings of the invention.

What is claimed is:

1. A single carrier/multi carrier community receiver, comprising:
a first discrete Fourier transform unit, for generating a frequency-domain signal by executing a first discrete Fourier transform on a signal received by the single carrier/multi carrier community receiver;
a first frequency-domain equalizer, coupled to the first discrete Fourier transform unit, for generating a first equalized frequency-domain signal by executing a first equalizing process on the frequency-domain signal;
a compensating circuit, coupled to the first frequency-domain equalizer, for compensating the first equalized frequency-domain signal to generate a second equalized frequency-domain signal;
an inverse discrete Fourier transform unit, coupled to the compensating circuit, for generating an equalized time-domain signal by executing an inverse discrete Fourier transform according to the second equalized frequency-domain signal; and
a slicer, coupled to the inverse discrete Fourier transform unit and the compensating circuit, for generating a sliced time-domain signal by executing a slicing process according to the equalized time-domain signal;
wherein the compensating circuit compensates the first equalized frequency-domain signal to generate the second equalized frequency-domain signal according to the sliced time-domain signal.

2. The single carrier/multi carrier community receiver of claim 1, wherein the compensating circuit comprises:
a second frequency-domain equalizer, coupled between the first frequency-domain equalizer and the inverse discrete Fourier transform unit, for generating the second equalized frequency-domain signal by executing a second equalizing process on the first equalized frequency-domain signal;
a second discrete Fourier transform unit, coupled to the second frequency-domain equalizer and the slicer, for generating a sliced frequency-domain signal by executing a second discrete Fourier transform on the sliced time-domain signal; and
a coefficient adjusting circuit, coupled to the second frequency-domain equalizer, for adjusting at least one coefficient of the second frequency-domain equalizer according to the first equalized frequency-domain signal and the sliced frequency-domain signal.

3. The single carrier/multi carrier community receiver of claim 2, wherein the second frequency-domain equalizer is an adaptive filter.

4. The single carrier/multi carrier community receiver of claim 2, wherein the coefficient adjusting circuit adjusts the at least one coefficient of the second frequency-domain equalizer by executing a Least Mean Square (LMS) operation at least according to the first equalized frequency-domain signal and the sliced frequency-domain signal.

5. The single carrier/multi carrier community receiver of claim 2, wherein the coefficient adjusting circuit adjusts the at least one coefficient of the second frequency-domain equalizer by executing a Recursive Least Square (RLS) operation at least according to the first equalized frequency-domain signal and the sliced frequency-domain signal.

6. The single carrier/multi carrier community receiver of claim 1, wherein the received signal is a single carrier signal.

7. A method for processing a received signal received by a single carrier/multi carrier community receiver, comprising:
generating a frequency-domain signal by executing a first discrete Fourier transform on the received signal;

generating a first equalized frequency-domain signal by executing a first equalizing process on the frequency-domain signal;

compensating the first equalized frequency-domain signal to generate a second equalized frequency-domain signal;

generating an equalized time-domain signal by executing an inverse discrete Fourier transform according to the second equalized frequency-domain signal; and generating a sliced time-domain signal by executing a slicing process according to the equalized time-domain signal;

wherein the step of compensating the first equalized frequency-domain signal comprises compensating the first equalized frequency-domain signal to generate the second equalized frequency-domain signal according to the sliced time-domain signal.

8. The method of claim 7, wherein the step of compensating the first equalized frequency-domain signal comprises:

generating the second equalized frequency-domain signal by executing a second equalizing process on the first equalized frequency-domain signal;

generating a sliced frequency-domain signal by executing a second discrete Fourier transform on the sliced time-domain signal; and adjusting at least one coefficient of the second frequency-domain equalizer according to the first equalized frequency-domain signal and the sliced frequency-domain signal.

9. The method of claim 8, wherein the second equalizing process is an adaptive filtering process.

10. The method of claim 8, wherein the step of adjusting the at least one coefficient of the second equalizing process comprises:

adjusting the at least one coefficient of the second equalizing process by executing a Least Mean Square (LMS) operation at least according to the first equalized frequency-domain signal and the sliced frequency-domain signal.

11. The method of claim 8, wherein the step of adjusting the at least one coefficient of the second equalizing process comprises:

adjusting the at lest one coefficient of the second equalizing process by executing a Recursive Least Square (RLS) operation at least according to the first equalized frequency-domain signal and the sliced frequency-domain signal.

12. The method of claim 7, wherein the received signal is a single carrier signal.

13. A single carrier/multi carrier community receiver, comprising:

a first discrete Fourier transform unit, for generating a frequency-domain signal by executing a discrete Fourier transform on a signal received by the single carrier/multi carrier community receiver;

a first frequency-domain equalizer, coupled to the first discrete Fourier transform unit, for generating an equalized frequency-domain signal by executing a first equalizing process on the frequency-domain signal;

an inverse discrete Fourier transform unit, coupled to the first frequency-domain equalizer, for generating a first equalized time-domain signal by executing an inverse discrete Fourier transform according to the equalized frequency-domain signal;

a compensation circuit, coupled to the inverse discrete Fourier transform unit, for compensating the first equalized time-domain signal to generate a second equalized time-domain signal; and a slicer, coupled to the compensating circuit, for generating a sliced time-domain signal by executing a slicing process according to the second equalized time-domain signal;

wherein the compensating circuit compensates the first equalized time-domain signal to generate the second equalized time-domain signal according to the sliced time-domain signal.

14. The single carrier/multi carrier community receiver of claim 13, wherein the compensating circuit comprises:

a time-domain equalizer, coupled between the inverse discrete Fourier transform unit and the slicer, for generating the second equalized time-domain signal by executing a second equalizing process on the first equalized time-domain signal, wherein the slicer generates the sliced time-domain signal by executing the slicing process on the second equalized time-domain signal; and a coefficient adjusting circuit, coupled to the time-domain equalizer, for adjusting at least one coefficient of the time-domain equalizer according to the first equalized time-domain signal and the sliced time-domain signal.

15. The single carrier/multi carrier community receiver of claim 14, wherein the time-domain equalizer is an adaptive filter.

16. The single carrier/multi carrier community receiver of claim 14, wherein the coefficient adjusting circuit adjusts the at least one coefficient of the time-domain equalizer by executing a Least Mean Square (LMS) operation at least according to the first equalized time-domain signal and the sliced time-domain signal.

17. The single carrier/multi carrier community receiver of claim 14, wherein the coefficient adjusting circuit adjusts the at least one coefficient of the time-domain equalizer by executing a Recursive Least Square (RLS) operation at least according to the first equalized time-domain signal and the sliced time-domain signal.

18. A method for processing a received signal received by a single carrier/multi carrier community receiver, comprising:

generating a frequency-domain signal by executing a discrete Fourier transform on the received signal;

generating an equalized frequency-domain signal by executing a first equalizing process on the frequency-domain signal;

generating a first equalized time-domain signal by executing an inverse discrete Fourier transform according to the equalized frequency-domain signal;

compensating the first equalized time-domain signal to generate a second equalized time-domain signal; and generating a sliced time-domain signal by executing a slicing process according to the second equalized time-domain signal;

wherein the step of compensating the first equalized time-domain signal comprises compensating the first equalized time-domain signal to generate the second equalized time-domain signal according to the sliced time-domain signal.

19. The method of claim 18, wherein the step of compensating the first equalized time-domain signal comprises:

generating the second equalized time-domain signal by executing a second equalizing process on the first equalized time-domain signal; and adjusting at least one coefficient of the second equalizing process according to the first equalized time-domain signal and the sliced time-domain signal; and the step of generating the sliced time-domain signal comprises:

generating the sliced time-domain signal by executing the slicing process on the second equalized time-domain signal.

20. The method of claim 19, wherein the second equalizing process is an adaptive filtering process.

21. The method of claim 19, wherein the step of adjusting the at least one coefficient of the second equalizing process comprises:

adjusting the at least one coefficient of the second equalizing process by executing a Least Mean Square (LMS) operation at least according to the first equalized time-domain signal and the sliced time-domain signal.

22. The method of claim 19, wherein the step of adjusting the at least one coefficient of the second equalizing process comprises:

adjusting the at least one coefficient of the second equalizing process by executing a Recursive Least Square (LMS) operation at least according to the first equalized time-domain signal and the sliced time-domain signal.

* * * * *